Patented Dec. 16, 1924.

1,519,801

UNITED STATES PATENT OFFICE.

HENRY RILEY, OF KEARNEY, NEW JERSEY, ASSIGNOR OF ONE-THIRD TO HAROLD A. MILLER, OF BELLEVILLE, NEW JERSEY, AND ONE-THIRD TO ALFRED A. K. HARLOW, OF NUTLEY, NEW JERSEY.

YEAST FOOD AND PROCESS OF MAKING SAME.

No Drawing.     Application filed March 17, 1924.  Serial No. 699,892.

*To all whom it may concern:*

Be it known that I, HENRY RILEY, a citizen of the United States, residing in the town of Kearney, in the county of Hudson, and State of New Jersey, have invented new and useful Improvements in Yeast Foods and Processes of Making Same, of which the following is a specification.

The invention relates broadly to the art of baking, with special reference to leavened bread, buns and cake and has as one of its objects to provide a composition of matter for materially lessening the quantity of yeast used in the leavening and ripening of the dough batch and which also reduces the quantity of sugar from that ordinarily required.

A further purpose is to provide a composition that acts as a yeast food or stimulant, increasing its bulk and protoplasmic content and improving the quality of the baked product, which shows a marked uniformity in its structure as to porosity, has a desirable flavor and retains its fresh appearance and taste due to its enhanced retention of moisture.

Another aim is in the provision of a definite process used in the preparation and production of the finished article, which includes the selection, quantitative apportioning, individual treatment accorded the elements, blending, intimately mixing and cooking, as will hereinafter be explained and described in detail.

The term yeast is applied to the spumy foam or froth of fermenting liquors and is constituted of the spores of minute living organisms which must be fed from time to time in order to increase the growth or otherwise the crypogamic germs die and the yeast loses its leavening properties and becomes an inert, evil appearing and foul smelling mass.

However yeast may be kept indefinitely by evaporation and regain its functions by moisture and warmth.

The province of yeast in bread making, bread being used as a generic term, is to commingle with the dough causing a mild effervescence, the gas produced forming small bubbles that permeate the dough mass and effects the phenomena generally called "rising."

Flour made by finely grinding grains, particularly wheat, is chiefly starch, with a certain small percentage of salts, as potassium phosphates, vegetable albumin and others in a lesser degree, not readily soluble and therefore, even when the flour is wet, it does not coalesce with the ferment of the yeast for a considerable period of time, if at all.

To incite and increase the action of yeast it is known that bakers use certain salts as calcium, ammonium, and potassium salts, but calcium sulphate, the form of salt used, under conditions of continuous moisture, forms hard lumps of an objectionable nature.

Ammonium chloride and potassium bromate, deliquesce and deteriorate so rapidly as to fail in sustaining the growth of yeast even when having been dissolved in the water used in mixing the dough.

With these facts in mind the nature of the invention will be seen from the following illustrative examples:—

*Example I.*—One quart (two pounds) of sound white or Irish potatoes are peeled, washed and boiled in three quarts of pure water until well cooked. Three quarters ounce of hops are boiled in the water, strained from the potatoes, for ten minutes or until the essential properties of the hops are extracted; to this decoction is added one and one quarter pounds of wheat flour and when mixed, the potatoes, previously mashed, are sifted in.

This pasty mixture is beat until quite stiff, approximately ten minutes, and allowed to remain quiet for four hours, in a warm place, at approximately 75 degrees Fah.

At the end of this period it has mixed into it two ounces of any preferred liquid yeast in an active state, and one pound of molasses, whereupon the mass begins to work and is agitated by stirring for four hours.

To this mass is added four pounds of calcium sulphate in a finely powdered condition, and twelve ounces ammonium chloride.

This mass is stirred intermittently five or six times per hour for eight hours at which time it stops working and forms a thick paste capable of being molded and compressed into blocks ready for immediate use.

By the addition of the calcium sulphate and ammonium chloride or salt, the increase of yeast cells is stopped and the living yeast cells in the mixture are killed and autolyzed and turned into the sources of nitrogen so that the finished product has undergone a chemical change and constitutes a nitrogenous composition which, when subsequently mixed with yeast, either in the making of dough batches or for any other purpose for which yeast may be used for fermentation, it will increase the effectiveness of the yeast by creating a growth of the yeast cells.

*Example II.*—Two pounds of a carbohydrate material, such as wheat germs, maize germs, rice polishings, wheat bran, hominy, corn meal or their equivalent, are boiled in three quarts of pure water until well cooked. Three quarters of an ounce of hops are boiled in water which has been strained off from the boiled carbohydrate material, this operation consuming about ten minutes, or until the essential ingredients of the hops have been extracted.

The strained hop-decoction is then thickened by means of one and one quarter pound of wheat flour, and the resulting mixture is incorporated with the mashed carbohydrate material obtained as above. The pasty mixture resulting from these operations is then beaten until quite stiff, which will require about ten minutes, and is then allowed to remain at rest for four hours, in a warm place, preferably at approximately 75° Fahrenheit. At the end of this period there are mixed with the material two ounces of any preferred liquid yeast in an active state, and one pound of molasses, whereupon the mass will begin to ferment or "work". During this fermentation the mass should be agitated; four hours being considered sufficient for this action to continue.

At the end of this period, there are added to the mass four pounds of finely divided calcium sulphate. The resulting mixture is stirred intermittently five or six times per hour for eight hours at which time it stops working and forms a thick paste capable of being moulded and compressed into blocks ready for immediate use.

Inasmuch as the carbohydrate materials, such as wheat germs, maize germs, rice polishings, wheat bran, hominy or corn meal employed for the preparation of the original yeast-culture medium, as outlined in the herein-contained description, are rich in water-soluble and B-vitamines, and at the same time contain considerable amounts of mineral salts essential to growth, the final product will consequently likewise be rich in such vitamines and mineral salts.

If it is not desired to use the same at once, when in a fresh condition, the mass may be desiccated, powdered and put in containers, in which it will keep indefinitely and upon adding a suitable quantity of warm water is at once ready for mixing with a dough batch for a yeast food.

The foregoing formulæ may be modified by substituting rye flour or corn meal for the potato content and ammonium tartrate or ammonium carbonate for the ammonium chlorid without materially affecting the product.

Another modification is to add one half the quantity, by weight, of pure grain dried or powdered yeast to the foregoing, which then makes a good strong yeast, capable of being dried and used as a yeast powder, this preparation having excellent keeping qualities.

By the process described it is found that the mineral salts are absorbed by the yeast cells and intimately, indissolubly incorporated, becoming converted into a pure homogenous product not subject to any deterioration from change of climate or like influences.

While the foregoing is generally descriptive of the process employed and ingredients used, it is to be understood that the same may be modified in minor respects, in proportion, time periods and that the substitution of equivalents for the mentioned mineral salts may be made without departing from the spirit and scope of the invention as recited in the appended claims.

Having thus described my invention, what I claim as new and desire to secure by Letters Patent, is:—

1. A yeast food prepared by propagating yeast in a mixture of boiled potato pulp and water used in boiling the same, hop extract and wheat flour and molasses, and causing autolysis of the yeast by addition of calcium sulphate and an ammonium salt.

2. A yeast food prepared by propagating yeast in a mixture of boiled potato pulp and water used in boiling the same, hop extract and wheat flour and molasses, and causing autolysis of the yeast by addition of calcium sulphate and an ammonium chloride.

3. A yeast food prepared by propagating yeast in a mixture of boiled potato pulp and water used in boiling the same, wheat flour and molasses, and causing autolysis of the yeast by addition of calcium sulphate and an ammonium salt.

4. A yeast food prepared by propagating yeast in a mixture of boiled potato pulp and water used in boiling the same, wheat flour and molasses, and causing autolysis of the yeast by addition of calcium sulphate and an ammonium chloride.

5. A yeast food prepared by propagating yeast in a mixture of boiled potato pulp and water used in boiling the same, wheat flour and a sugar containing substance, and causing autolysis of the yeast by addition of calcium sulphate and an ammonium salt.

6. A yeast food prepared by propagating yeast in a mixture of boiled potato pulp and water used in boiling the same, wheat flour and a sugar containing substance, and causing autolysis of the yeast by addition of calcium sulphate and an ammonium chloride.

7. The process of making a yeast food comprising cultivation of the yeast in a nutrient medium, then checking its growth and causing its autolysis by addition of calcium sulphate and ammonium salt.

8. The process of making a yeast food comprising cultivation of the yeast in a nutrient medium, then checking its growth and causing its autolysis by addition of calcium sulphate and ammonium salt, drying and pulverizing the mixture.

9. The process of making a yeast food comprising cultivation of the yeast in a nutrient medium, then checking its growth and causing its autolysis by addition of calcium sulphate and ammonium chloride.

10. The process of making a yeast food comprising cultivation of the yeast in a mixture of boiled potato pulp and water used in boiling the same, wheat flour and a sugar containing substance, then causing autolysis of the yeast by addition of non-poisonous calcium and ammonium soluble salts.

11. The process of making a yeast food comprising cultivation of the yeast in a mixture of boiled potato pulp and water used in boiling the same, wheat flour and a sugar containing substance, then causing autolysis of the yeast by addition of non-poisonous calcium and ammonium soluble salts, and subsequently drying and pulverizing the resultant mixture.

12. A yeast-food prepared by propagating yeast in a mixture of boiled carbohydrate material, hop extract prepared with the water in which the carbohydrate material has been boiled, wheat flour and a saccharine substance, and causing autolysis of the yeast by the addition of calcium sulphate.

13. A yeast-food prepared by propagating yeast in a mixture of boiled carbohydrate material, the water in which the carbohydrate material has been boiled, hop-extract, wheat flour and a saccharine substance, and causing autolysis of the yeast by the addition of calcium sulphate.

14. A yeast-food prepared by propagating yeast in a mixture of boiled carbohydrate material, the water in which the carbohydrate has been boiled, hop-extract, wheat flour and molasses, and causing the autolysis of the yeast by the addition of calcium sulphate, substantially as described.

15. A yeast-food rich in mineral salts and vitamines, prepared by propagating yeast in a yeast-culture medium, consisting of boiled carbohydrate material, as wheat germs, the water in which said carbohydrate material has been boiled, hop extract, flour and molasses, and causing the autolysis of the yeast by the addition to the mass of calcium sulphate, substantially as described.

16. The process of preparing a yeast food, consisting in propagating yeast in a yeast-culture medium prepared from boiled carbohydrate material, hop-extract prepared with the water in which the carbohydrate material has been boiled, wheat flour and a saccharine substance, checking the growth of the yeast and causing its autolysis by the addition of calcium sulphate.

17. The process of preparing a yeast food, consisting in propagating yeast in a yeast-culture medium prepared from boiled carbohydrate material, the water in which the carbohydrate has been boiled, hop extract, wheat flour and a saccharine substance, checking the growth of the yeast and causing its autolysis by the addition of calcium sulphate, substantially as described.

18. The process of preparing a yeast food, consisting in propagating yeast in a yeast-culture medium prepared from boiled carbohydrate material, as wheat germs, the water in which said carbohydrate material has been boiled, hop extract, flour and molasses, checking the growth of the yeast and causing its autolysis by the addition of calcium sulphate, substantially as described.

19. The process of preparing a yeast food by propagating yeast in a suitable yeast-culture medium, and checking the growth of the yeast and causing its autolysis by the addition of calcium sulphate, substantially as described.

20. The process of preparing a yeast food rich in mineral salts and vitamines, by propagating yeast in a suitable yeast-culture medium, and checking the growth of the yeast and causing its autolysis by the addition of calcium sulphate, substantially as described.

21. The process of preparing a yeast food, consisting in propagating yeast in a yeast-culture medium prepared from boiled carbohydrate material, as wheat germs, the water in which said carbohydrate material has been boiled, hop extract, flour and molasses, checking the growth of the yeast and causing its autolysis by the addition of calcium sulphate, and subsequently drying and pulverizing the resultant mixture, substantially as described.

22. The process of preparing a yeast food, consisting in propagating yeast in a suitable yeast-culture medium, checking the growth of the yeast and causing its autolysis by the addition of calcium sulphate, and subsequently drying and pulverizing the resultant mixture, substantially as described.

23. A yeast food consisting of autolyzed yeast and a calcum sulphate which has autolyzed it.

24. Process of producing a yeast food from yeast, by causing the autolysis of the yeast by the addition thereto of calcium sulphate.

This specification signed and witnessed this 29th day of February, 1924.

HENRY RILEY.

Witnesses:
FRED'K C. FISCHER,
HARRY SOMMERS.